United States Patent [19]

Takemi et al.

[11] Patent Number: 4,470,269
[45] Date of Patent: Sep. 11, 1984

[54] ABSORPTION REFRIGERATION SYSTEM UTILIZING LOW TEMPERATURE HEAT SOURCE

[75] Inventors: Hideo Takemi, Ibaraki; Toshio Yatabe, Funabashi, both of Japan

[73] Assignee: Hitachi, Ltd., Tokyo, Japan

[21] Appl. No.: 442,112

[22] Filed: Nov. 16, 1982

[30] Foreign Application Priority Data

Nov. 19, 1981 [JP] Japan ................................ 56-183707

[51] Int. Cl.$^3$ ........................ F25B 27/00; F25B 15/00
[52] U.S. Cl. ...................................... 62/235.1; 62/476
[58] Field of Search ................................ 62/235.1, 476

[56] References Cited

U.S. PATENT DOCUMENTS 4,246,762 1/1981 Bourne .................................. 62/476

Primary Examiner—Lloyd L. King
Attorney, Agent, or Firm—Antonelli, Terry & Wands

[57] ABSTRACT

An absorption refrigeration system utilizing solar heat including an absorption cold and warm water system and a solar heat collector unit. Heating and cooling of an enclosure are performed by the absorption cold and warm water system, and the solar heat collector unit can be switched to allow warm water obtained by heating water by solar heat to flow to a low temperature heat source generator in a cooling mode and to an evaporator in a heating mode.

7 Claims, 2 Drawing Figures

FIG. I

ABSORPTION REFRIGERATION SYSTEM UTILIZING LOW TEMPERATURE HEAT SOURCE

BACKGROUND OF THE INVENTION (1) Field of the Invention

This invention relates to an absorption refrigeration system utilizing a low temperature heat source as a second heat source.

(2) Description of the Prior Art

U.S. Pat. No. 4,246,762 discloses a system comprising a generator, a condenser, an evaporator, an absorber and a heat exchanger constituting an absorption refrigeration system which is further provided with a generator of low temperature energy.

This system offers the advantage that a main heat source and an auxiliary heat source, such as solar heat, can both be utilized, thereby enabling energy to be conserved.

This invention disclosed in this prior art document fails, however, to disclose utilization of the solar heat not only in the cooling mode but also in the heating mode and a construction necessary to achieve the purpose. Thus the question of utilizing the solar heat both for cooling and heating purposes remains unsolved.

SUMMARY OF THE INVENTION (1) Objects of the Invention

An object of this invention is to provide an absorption refrigeration system capable of utilizing a low temperature heat source both for cooling and heating purposes.

Another object is to provide an absorption refrigeration system capable of readily switching inputs applied to the low temperature heat source when the cooling mode is switched to the heating mode or vice versa.

(2) Statement of the Invention

To accomplish the aforesaid objects, the invention provides an absorption refrigeration system comprising an absorption cold and warm water system including a low temperature heat source generator and a high temperature heat source generator, and a solar heat collector unit. An inlet and an outlet of a heating tube of the low temperature heat source generator and an inlet and an outlet of a cold water tube of an evaporator of the absorption cold and warm water system are connected to a warm water outlet line and a warm water inlet line of the solar heat collector unit respectively, and valves are mounted in these lines for selectively switching the system between two warm water systems, one warm water system being for the warm water heated by the solar heat collector unit to flow from the warm water outlet line of the solar heat collector unit to the warm water inlet line thereof through the heating tube of the low temperature heat source generator, and the other warm water system being for the warm water heated by the solar heat collector unit to flow from the warm water outlet line of the solar heat collector unit to the warm water inlet line thereof through the cold water tube of the evaporator.

DETAILED DESCRIPTION OF THE PREFERRED EMBODIMENTS

Figure 1:
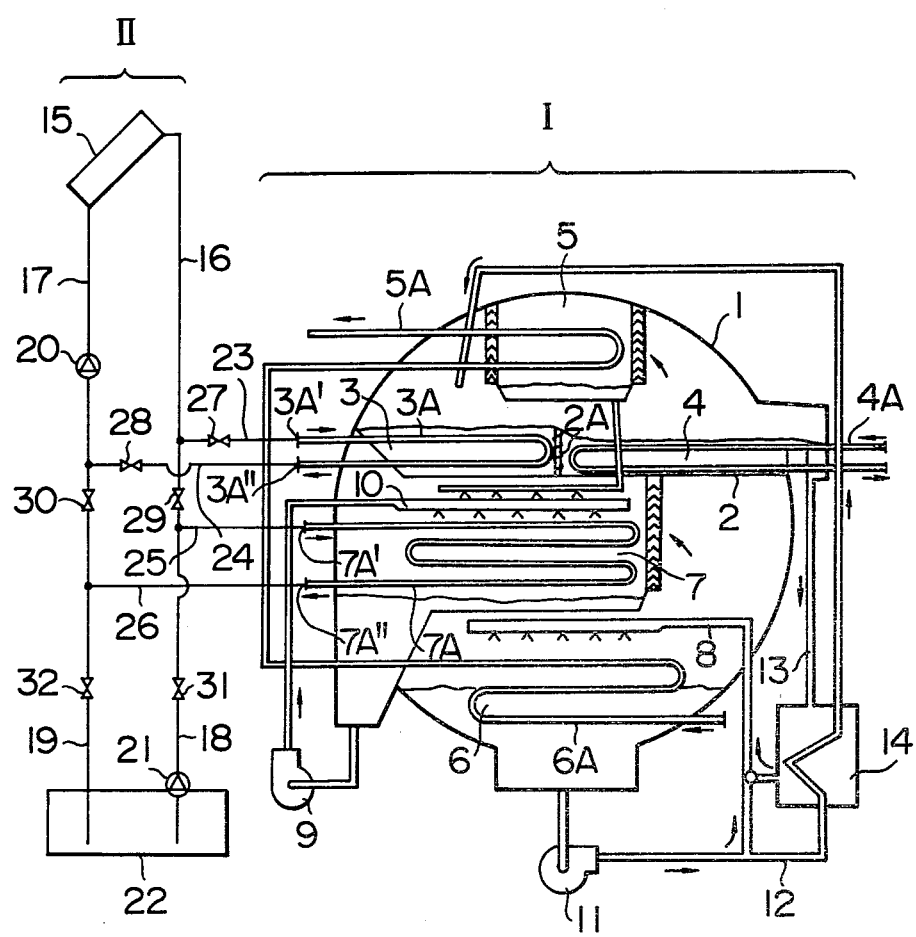
FIG. 1 is a systematic view of a system according to the invention comprising one embodiment thereof.

FIG. 1 shows one embodiment of the invention in a systematic view. The system shown in FIG. 1 comprises an absorption cold and warm water system I of single utility, and a solar heat collector unit II.

The absorption cold and warm water system I comprises a shell 1 having the interior divided by a partition wall 2 into a high pressure section and a low pressure section.

The high pressure section has mounted in its space a low temperature heat source generator 3 utilizing warm water heated by the solar heat, a high temperature heat source generator 4 using warm water of higher temperature than the warm water heated by the solar heat or steam, and a condenser 5. A weir 2A separates a portion in which a solution of the low temperature heat source generator 3 is collected from a portion in which a solution of the high temperature heat source generator 4 is collected. The low temperature heat source generator 3, high temperature heat source generator 4 and condenser 5 have a heating tube 3A, a heating tube 4A and a cooling water tube 5A respectively.

Meanwhile the low temperature section has mounted in its space an absorber 6 and an evaporator 7. The absorber 6 has a cooling water tube 6A and a spray header 8, and the evaporator 7 has a water tube 7A, a refrigerant pump 9 and a spray header 10.

The absorber 6 has at its bottom portion a solution pump 11 having a dilute solution supply line 12 connected to its outlet. The dilute solution supply line 12 opens at its end portion in the low temperature heat source generator 3.

The high temperature heat source generator 4 has mounted therein a concentrated solution return line 13 connected at its end portion to the spray header 8 which in turn is connected to the dilute solution supply line 12 midway between its ends.

A heat exchanger 14 is mounted in the dilute solution supply line 12 and the concentrated solution return line 13 midway between their ends, to allow heat exchange to take place between the two solutions.

In the absorption cold and warm water system I of the aforesaid construction, refrigerant vapor produced by evaporation of a refrigerant fluid in the evaporator 7 flows to the absorber 6 where it is absorbed by a solution shot out through the spray header 8, so that the solution in the absorber 6 is diluted. At this time, cooling is effected by cooling water flowing through the cooling water tube 6A to help absorption of the refrigerant vapor by the solution to be effected satisfactorily.

The solution that has thus been diluted is fed under pressure by the solution pump 11 through the dilute solution supply line 12 into the low temperature heat source generator 3.

Meanwhile a portion of the dilute solution delivered by the solution pump 11 is mixed with a concentrated solution flowing from the high temperature heat source generator 4 through the concentrated solution return line 13, and the mixture is sprayed on to the cooling water tube 6A of the absorber 6 through the spray header 8.

The dilute solution introduced into the low temperature heat source generator 3 as aforesaid is heated by a heating medium which is warm water heated by the solar heat supplied from the solar heat collector unit II and flows through the heating tube 3A. Thus the refrigerant is evaporated and the solution is brought to an intermediate concentrated condition in which the solution is intermediate between the dilute solution and the concentrated solution.

As the dilute solution is further fed into the low temperature heat source generator 3, the solution overflows the weir 2A into the high temperature heat source generator 4 where the solution is further heated by a heating medium flowing through the heating tube 4 of higher temperature than the heating medium of the low temperature heat source generator 3, to be further concentrated to produce refrigerant vapor.

The refrigerant vapor produced in the high temperature heat source generator 4 as aforesaid and the refrigerant vapor produced in the low temperature heat source generator 3 flow into the condenser 5 where they are heated by the cooling water flowing through the cooling water tube 5A into a condensate. The refrigerant fluid obtained by condensation flows through a refrigerant tube into the evaporator 7 where it is evaporated together with a refrigerant fluid delivered under pressure by the refrigerant pump 9 and shot out of the spray header 10. The refrigerant fluid that failed to vaporize is collected at the bottom of the evaporator 7, to be sprayed through the spray header 10 by the refrigerant pump 9.

Meanwhile the concentrated solution in the high temperature heat source generator 4 flows through the concentrated solution return line 13 and the heat exchanger 14 to the spray header 8 where it is mixed with the dilute solution and the mixture is shot out of the spray header 8 to be sprayed on to the absorber 6.

The absorption cold and warm water system I repeatedly performs the aforesaid cycle of operation during operation.

The solar heat collector unit II comprises a collector body 15, a warm water outlet line 16 and a warm water inlet line 17 connected to the collector body 15, a cold water inlet line 18 and a cold water outlet line 19 supplying cold water to the evaporator 7 of the absorption cold and warm water system I and drawing cold water therefrom respectively, a warm water circulation pump 20, a cold water feed pump 21 and a cold water tank 22.

The warm water outlet line 16 and warm water inlet line 17 have connected thereto through lines 23 and 24, respectively, an inlet 3A' and an outlet 3A" of the heating line 3A of the low temperature heat source generator 3 of the absorption cold and warm water system I. A connection between the warm water outlet line 16 and the cold water inlet line 16 and a connection between the warm water inlet line 17 and the cold water outlet line 19 are connected through lines 25 and 26, respectively, to an inlet 7A' and an outlet 7A" of the evaporator 7 of the absorption cold and warm water system.

Valves 27 and 28 are mounted in lines 23 and 24 connected to the warm water outlet line 16 and warm water inlet line 17 respectively. Valves 29 and 30 are mounted in a portion of the warm water outlet line 16 between the lines 23 and 25 and in a portion of the warm water inlet line 17 between the lines 24 and 26, respectively. Valves 31 and 32 are mounted in the warm water inlet line 18 and cold water outlet line 19 respectively. By opening and closing the valves 27–32 suitably, it is possible to selectively supply the warm water heated by the solar heat to the two warm water systems. More specifically, when the valves 27 and 28 are opened and the valves 29 and 30 are closed, the warm water heated by the solar heat can be passed to one warm water system in which the warm water flows from the collector body 15 through the warm water outlet line 16, line 23, heating line 3A of low temperature heat source generator 3 and line 24 to the warm water inlet line 17. When the valves 29 and 30 are opened and the valves 27, 28, 31 and 32 are closed, the warm water heated by the solar heat can be passed to the other warm water system in which the warm water flows from the collector body 15 through the warm water outlet line 16, line 25, cold water line 7A of evaporator 7, line 26 and warm water inlet line 17.

Operation of the absorption refrigeration system utilizing solar heat of the construction described hereinabove will be described.

In a cooling mode for cooling an enclosure, for example, the valves 27, 28, 31 and 32 of the solar heat collector unit II are opened and the valves 29 and 30 thereof are closed to lead the warm water obtained at the collector body 15 through the warm water outlet line 16, line 23 and heating tube 3A to the low temperature heat source generator 3 of the absorption cold and warm water system I, to actuate the generator 3. At the same time, the cold water that has exchanged heat with the solution at the low temperature heat source generator 3 is returned through the heating tube 3A, line 24 and warm water inlet line 17 to the collector body 15.

In parallel with the aforesaid operation, the cold water feed pump 21 of the solar heat collector unit II is actuated to introduce cold water to the evaporator 7 of the absorption cold and warm water system I through the cold water inlet line 18, line 25 and cold water tube 7A, to reduce the temperature of the cold water to a predetermined level by the vaporization reaction of the refrigerant. The cold water having had its temperature reduced is led throgh the cold water tube 7A, line 26 and cold water outlet line 19 to a fan coil unit in the enclosure to cool the interior of the enclosure.

When contribution of the solar heat collector unit to obtaining necessary amount of heat for performing a cooling operation is not enough, a heating medium of a temperature higher than that of the solar heat is fed into the heating tube 4A to actuate the high temperature heat source generator 4 of the absorption cold and warm water system I. Thus a normal absorption cycle can be formed to enable cooling operation to be performed satisfactorily.

Meanwhile in a heating mode for heating an enclosure, for example, the valves 27, 28, 31 and 32 of the solar heat collector unit II are closed and the valves 29 and 30 thereof are opened to lead the warm water obtained at the collector body 15 through the warm water outlet line 16, line 25 and cold water tube 7A to the evaporator 7 of the absorption cold and warm water system II, to allow the system to function as a heat pump.

Also, a heating medium is introduced from a high temperature heat source into the heating tube 4A to actuate the high temperature heat source generator 4.

At the same time, water is passed to the cooling water tube 6A extending around a heat generating section of the absorber 6 and condenser 5 to allow heat exchange to take place between the absorber 6 and condenser 5, so as to draw off the cooling water tube 5A of the condenser 5 warm water of elevated temperature high enough to be used for heating purposes. The warm water obtained in this way is led to the fan coil unit in the enclosure to heat the interior thereof.

Meanwhile the warm water heated by the solar heat led to the cold water tube 7A is allowed to exchange heat with the refrigerant at the evaporator and then circulated through the cold water tube 7A, line 26 and warm water inlet line 17 back to the collector body 15. In the aforesaid heating mode, assume that the cycle heat input is 1 at the evaporator 7. In the embodiment described hereinabove, a cycle heat input of 1.6 of the high temperature heat source generator 4 side can be added to raise the amount of heat used for heating purposes to 2.6.

By utilizing warm water of low temperature heated by solar heat while operating the absorption cold and warm water system as in the wintertime, it is possible to conserve energy by about 40% when heating is carried out by using the absorption refrigeration system according to the invention as compared with heating carried out by means of a boiler, for example.

Figure 2:
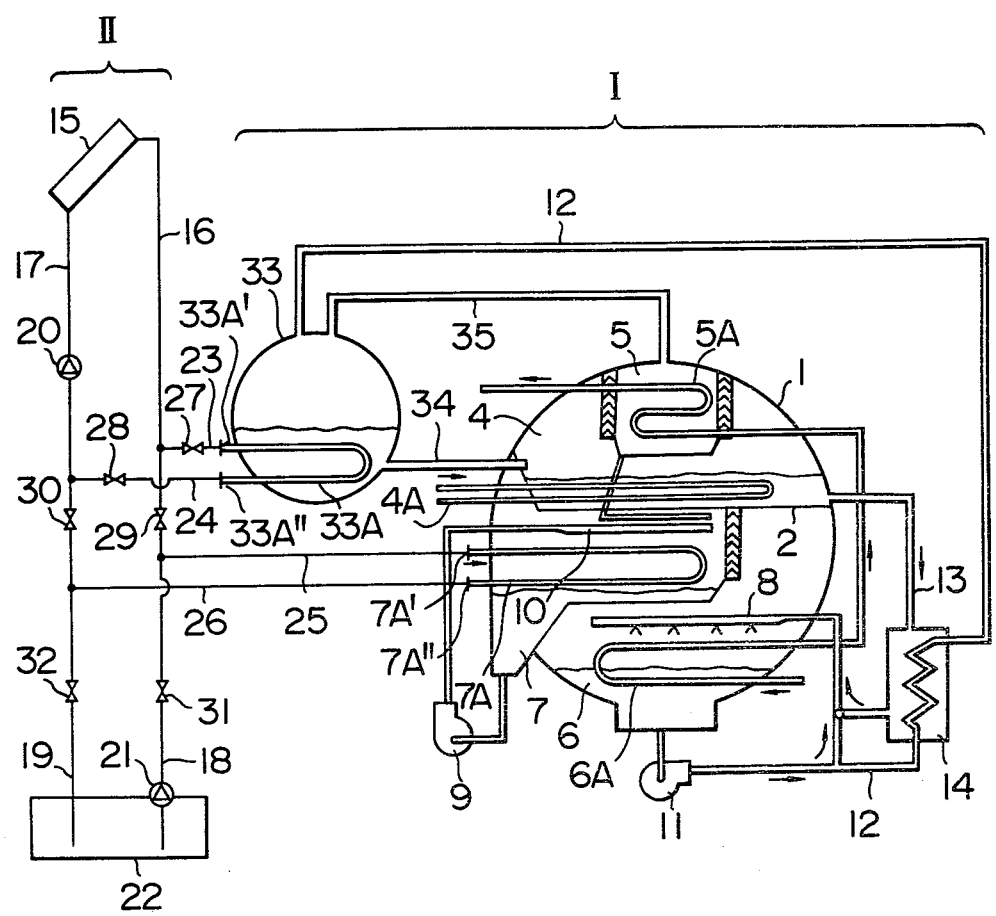
FIG. 2 is a view similar to FIG. 1 but showing a second embodiment.

FIG. 2 shows another embodiment of the invention in which a low tempeature heat source generator 33 is separated from other parts contained in the shell 1 and constitutes an independent unit which is connected to the high temperature heat source generator 4 through an intermediate concentration solution tube 34 and to the condenser 5 through a refrigerant vapor tube 35.

The low temperature heat source generator 33 has a heating tube 33A connected at an inlet 33A' and an outlet 33A" thereof to the warm water outlet line 16 and warm water inlet line 17 of the solar heat collector unit II through the lines 23 and 24 respectively.

The construction of the second embodiment is similar to that of the first embodiment except for the aforesaid differences, and there is no essential difference in operation between the two embodiments.

In the second embodiment, the low temperature heat source generator forms an independent unit. Alternatively, the high temperature heat source regenerator may be formed as an independent unit.

The invention has been described as being applied to a single utility absorption cold and warm water system. It is to be understood that the invention is not limited to this application and that it can have application in a double utility absorption cold and warm water system disclosed in Japanese Pat. No. 647,515 (Patent publication No. 32384/71), for example.

From the foregoing description, it will be appreciated that in the absorption refrigeration system utilizing solar heat according to the invention, solar heat can be utilized for cooling and heating purposes while the absorption cold and warm water system is in operation. That is, in the summertime in which the level of temperature of the collected solar heat is high, warm water heated by the solar heat is led to the low temperature heat source generator of the absorption cold and warm water system to serve as a cooling energy source, and in the wintertime in which the level of temperature of the collected solar heat is low, warm water of low temperature heated by the solar heat is led to the evaporator of the absorption cold and warm water system to enable the system to function as a heat pump to provide an additional heating energy source besides the high temperature heat source. Thus the invention enables effective use of the low temperature warm water heated by the solar heat to be achieved while the absorption cold and warm water system is being operated. The energy conservation achieved by the invention runs up to about 40%.

The aforesaid conservation of energy can be positively achieved by the feature that an inlet and an outlet of a cold water tube of an evaporator of the absorption cold and warm water system are connected to a warm water outlet line and a warm water outlet line of the solar heat collector unit respectively and valves are mounted in these lines for selectively switching the system between two warm water systems, one warm water system being for the warm water heated by the solar heat collector unit to flow from the warm water outlet line of the solar heat collector unit to the warm water inlet line thereof through the heating tube of the low temperature heat source generator, and the other warm water system being for the warm water heated by the solar heat collector unit to flow from the warm water outlet line of the solar heat collector unit to the warm water inlet line thereof through the cold water tube of the evaporator.

What is claimed is:

1. An absorption refrigeration system utilizing solar heat comprising:

a low temperature heat source generator;

a high temperature heat source generator;

a condenser for condensing refrigerant vapor produced at least one generator;

an evaporator for evaporating a refrigerant condensed by the condenser;

an absorber for producing a solution of low concentration by dissolving the refrigerant vapor produced in the evaporator in a solution of high concentration produced at the at least one generator;

a solar heat collector unit for absorbing solar heat and producing warm water;

line means for connecting together a tube for circulating a heat exchanging medium through the evaporator, a tube for circulating the heat exchange medium through the low temperature heat source generator and tubes for circulating the heat exchanging medium through the solar heat collector unit; and valve means mounted in said line means operative to selectively bring the tubes of said solar heat collector unit into communication with one of the tube of said evaporator and the tube of said low temperature heat source generator.

2. A system as claimed in claim 1, wherein said valve means are actuated in a heating mode to allow warm water heated by solar heat to circulate through the tube of the evaporator and the tubes of the solar heat collector unit to obtain warm water for heating purposes from the tubes of the absorber and the condenser.

3. A system as claimed in claim 1, further comprising a cold water tank in communication with the tubes of the solar heat collector unit and the tube of the evaporator through the valve means.

4. A system as claimed in claim 1, wherein a dilute solution of low concentration produced in the absorber flows to the low temperature heat source generator, and a solution in the low temperature heat source generator flows to the high temperature heat source generator.

5. A system as claimed in claim 4, wherein the low temperature heat source generator and the high temperature heat source generator are contained in a single shell which is divided into two sections by a weir.

6. A system as claimed in claim 4, wherein said low temperature heat source generator is contained in a shell separate from the shell in which said high temperature heat source generator is contained.

7. A system as claimed in claim 1, wherein said valve means are actuated in a cooling mode to allow the warm water heated by the solar heat to circulate through the tube of the low temperature heat source generator and the tubes of the solar heat collector unit to obtain cold water for cooling purposes from the tube of the evaporator.

\* \* \* \* \*